United States Patent
Yoshida

(10) Patent No.: US 12,314,470 B2
(45) Date of Patent: May 27, 2025

(54) INFORMATION PROCESSING SYSTEM USED IN CROSS REALITY

(71) Applicant: CANON KABUSHIKI KAISHA, Tokyo (JP)

(72) Inventor: Koji Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/429,767

(22) Filed: Feb. 1, 2024

(65) Prior Publication Data

US 2024/0281066 A1    Aug. 22, 2024

(30) Foreign Application Priority Data

Feb. 16, 2023   (JP) ................................ 2023-022531

(51) Int. Cl.
  *G06F 3/01*    (2006.01)
  *G06F 3/0346*  (2013.01)
  *G06F 3/038*   (2013.01)
  *G06F 3/04845* (2022.01)

(52) U.S. Cl.
  CPC ............ *G06F 3/014* (2013.01); *G06F 3/0346* (2013.01); *G06F 3/038* (2013.01); *G06F 3/0383* (2013.01); *G06F 3/04845* (2013.01); *G06F 2203/0331* (2013.01)

(58) Field of Classification Search
  CPC ........ G06F 3/014; G06F 3/0346; G06F 3/038; G06F 3/0383; G06F 3/04845; G06F 2203/0331; G06F 3/01; G06F 3/011; G06F 3/017
  See application file for complete search history.

(56) References Cited

U.S. PATENT DOCUMENTS

| | | | |
|---|---|---|---|
| 10,705,606 B1 * | 7/2020 | Colonnese | G06T 7/20 |
| 2002/0012014 A1 * | 1/2002 | Mohri | G06F 3/014 |
| | | | 715/863 |
| 2016/0041619 A1 | 2/2016 | Ishiwata | |
| 2017/0199586 A1 * | 7/2017 | Samuel | G06F 3/0346 |
| 2022/0122335 A1 * | 4/2022 | Robinson | G06F 3/0488 |
| 2023/0280840 A1 * | 9/2023 | Chang | G06T 7/246 |
| | | | 345/156 |
| 2023/0316674 A1 * | 10/2023 | Boesel | G06F 3/012 |
| | | | 345/633 |
| 2023/0341936 A1 * | 10/2023 | Inoue | G06F 3/0325 |
| 2023/0343052 A1 * | 10/2023 | Kimura | G06T 19/20 |
| 2024/0212293 A1 * | 6/2024 | Ichikawa | G01B 11/00 |

FOREIGN PATENT DOCUMENTS

| | | |
|---|---|---|
| WO | 2013/049248 A2 | 4/2013 |
| WO | 2021/055930 A1 | 3/2021 |

* cited by examiner

*Primary Examiner* — Antonio Xavier
(74) *Attorney, Agent, or Firm* — VENABLE LLP

(57) ABSTRACT

A first device to be attached to a head of a user has a display capable of displaying a CG object that moves according to motion of the hand of the user and a first sensor usable to detect the hand. A second device to be attached to the hand has a second sensor to be used to detect an orientation of the second device. A processing device determines a direction of the CG object based on the estimated orientation of the hand from a detection result by the first sensor in a case where the hand is detectable by the first sensor, and determines a direction of the CG object based on the orientation of the second device detected by the second sensor in a case where the hand is not detectable by the first sensor.

16 Claims, 5 Drawing Sheets

INFORMATION PROCESSING SYSTEM USED IN CROSS REALITY

BACKGROUND OF THE INVENTION

Field of the Invention

The present relates to an information processing system, especially that used in cross reality.

Description of the Related Art

As a technology to provide an experience in which a reality world and a virtual world are merged together, attention has been paid to cross reality (XR). In an XR system, a head-mounted display (HMD) attached to the head of a user is generally used. As one of user interfaces (UI) to operate a display screen of an HMD, there is a method using a computer graphics (CG) object that moves according to motion of a hand of a user. Such a type of CG object is called a "pointer," a "cursor," or the like, and particularly a pointer extending like a light beam (in a linear shape) from a hand of a user is also called a "ray."

With a pointer, a user is capable of indicating any position or object on an XR space displayed on an HMD. In addition, the user is capable of performing an operation such as depressing a button on the XR space, moving a slider, and attracting a distant object in combination with a selective operation such as depressing a button of a hand controller and pinch by a hand gesture.

For example, WO 2021/055930 proposes an input device that photographs a hand of a user with a camera installed in an HMD, analyzes an image obtained by photographing the hand through a machine learning model or the like, and estimates a position and an orientation of the hand to determine a start point or a direction of a ray.

However, in the above conventional technology disclosed in WO 2021/055930, estimation of a position and an orientation of a hand is not enabled when a hand of a user moves to the outside of a range in which an image is capable of being photographed by a camera installed in an HMD. As a result, projection of a ray is made impossible since a start point or a direction of a ray is not determined, whereby a user is not enabled to perform an operation with the ray.

SUMMARY OF THE INVENTION

The present invention provides a technology to further improve operability of a CG object that moves according to motion of a hand of a user.

An information processing system according to the present invention includes: a first device to be attached to a head of a user; a second device to be attached to a hand of the user; and a processing device, wherein the first device has a display capable of displaying a computer graphics (CG) object that moves according to motion of the hand of the user and a first sensor usable to detect the hand of the user, the second device has a second sensor to be used to detect an orientation of the second device, and the processing device estimates an orientation of the hand of the user from a detection result by the first sensor and determines a direction of the CG object based on the estimated orientation of the hand in a case where the hand of the user is detectable by the first sensor, and determines a direction of the CG object based on the orientation of the second device detected by the second sensor in a case where the hand of the user is not detectable by the first sensor.

Further features of the present invention will become apparent from the following description of exemplary embodiments with reference to the attached drawings.

DESCRIPTION OF THE EMBODIMENTS

Figure 1:
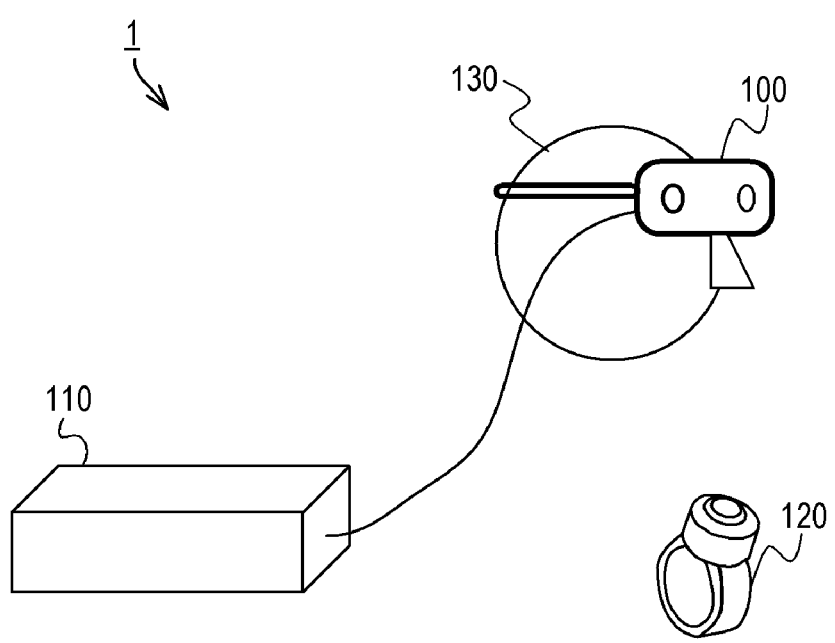
FIG. 1 is a diagram showing the entire configuration of an information processing system.

Hereinafter, preferred embodiments of the present invention will be described in detail on the basis of the accompanying drawings using a head-mounted display (HMD) as an example.

Entire System Configuration

An information processing system 1 according to an embodiment of the present invention will be described below with reference to FIGS. 1 to 5.

The information processing system 1 has an HMD (first device) 100, an image processing device (processing unit) 110, and a hand device (second device) 120. The information processing system 1 is an XR system used to let a user have a pseudo experience (Cross Reality: XR) in which a real world and a virtual world are merged together. The XR includes virtual reality (VR), augmented reality (AR), mixed reality (MR), substitutional reality (SR), or the like, but the information processing system 1 is applicable to any type of XR content.

The HMD 100 is a display device (head device) attached (to be attached) to a head 130 of a user. On the HMD 100, a combined image in which a captured image obtained by capturing an image of a visual field of the user and a computer graphics (CG) are combined together or the like is displayed. There are various modes such as a goggle type, a helmet type, and a glasses type as HMDs, but any of them may be used. Glasses-type HMDs are also called smart glasses.

The image processing device 110 is a control device that is responsible for performing processing such as controlling the HMD 100, processing a captured image photographed by a camera installed in the HMD 100, generating a content such as a CG, and generating a combined image displayed on the HMD 100. The image processing device 110 is made up of a computer including a CPU (processor) and a memory. Dedicated equipment may be used as the image processing device 110, but a smart phone, a tablet terminal, a personal computer (PC), video game equipment, or the like may also be, for example, used as the image processing device 110. The image processing device 110 is connected to the HMD 100 in a wireless or wired fashion. The image processing device 110 generates a combined image by combining a captured image with a CG and transmits the combined image to the HMD 100. Note that the respective configurations of the image processing device 110 may be embedded in the HMD 100.

The hand device 120 is an operation device attached to a hand of a user and is an input device used to input instructions (command) to the HMD 100. For example, when the user performs a prescribed input operation (action) with the hand device 120, a command corresponding to the input operation is received by the information processing system 1 and the HMD 100 or the image processing device 110 is controlled. With the hand device 120, the user is capable of performing an operation (for example, an operation such as switching a content to be reproduced and moving a display position of a CG object) on a user interface (UI) or a content displayed on the HMD 100.

The hand device 120 is also called a "hand controller" or simply a "controller." A type formed into a shape gripped (held) by a hand of the user is called a grip-type controller, a hand-held-type controller, or the like. A type used in a state of being attached to a hand or a finger of the user is called a wearable-type controller or the like. In the present embodiment, the hand device 120 of a ring type attachable to a finger of the user as shown in, for example, FIG. 1 is used. The hand device 120 attachable to a finger of the user has an advantage that the user is capable of freely moving a hand or the finger while holding the hand device 120, and that the hand is not likely to be hidden by the hand device 120. The hand device 120 performs wireless communication with the image processing device 110. As wireless communication, general-purpose wireless communication using, for example, a 2.4 GHz band is available.

Note that the shape of the hand device 120 is a ring type as described above but is not limited to this. For example, the shape of the hand device 120 may be a shape such as a grove type attachable to a hand or a shape such as a wristwatch type (bracelet type) attachable to a wrist. As described above, the hand device 120 may have such a shape as to be retainable by a hand of the user or attachable to the hand or a wrist so as to be easily used by the user. FIG. 1 shows only the one hand device 120. However, a plurality of hand devices may be provided to operate the HMD 100. For example, a hand device for a right hand and a hand device for a left hand may be provided, or hand devices may be attached to a plurality of fingers (for example, a thumb, an index finger, or the like), respectively.

Internal Configurations of HMD

Figure 2:
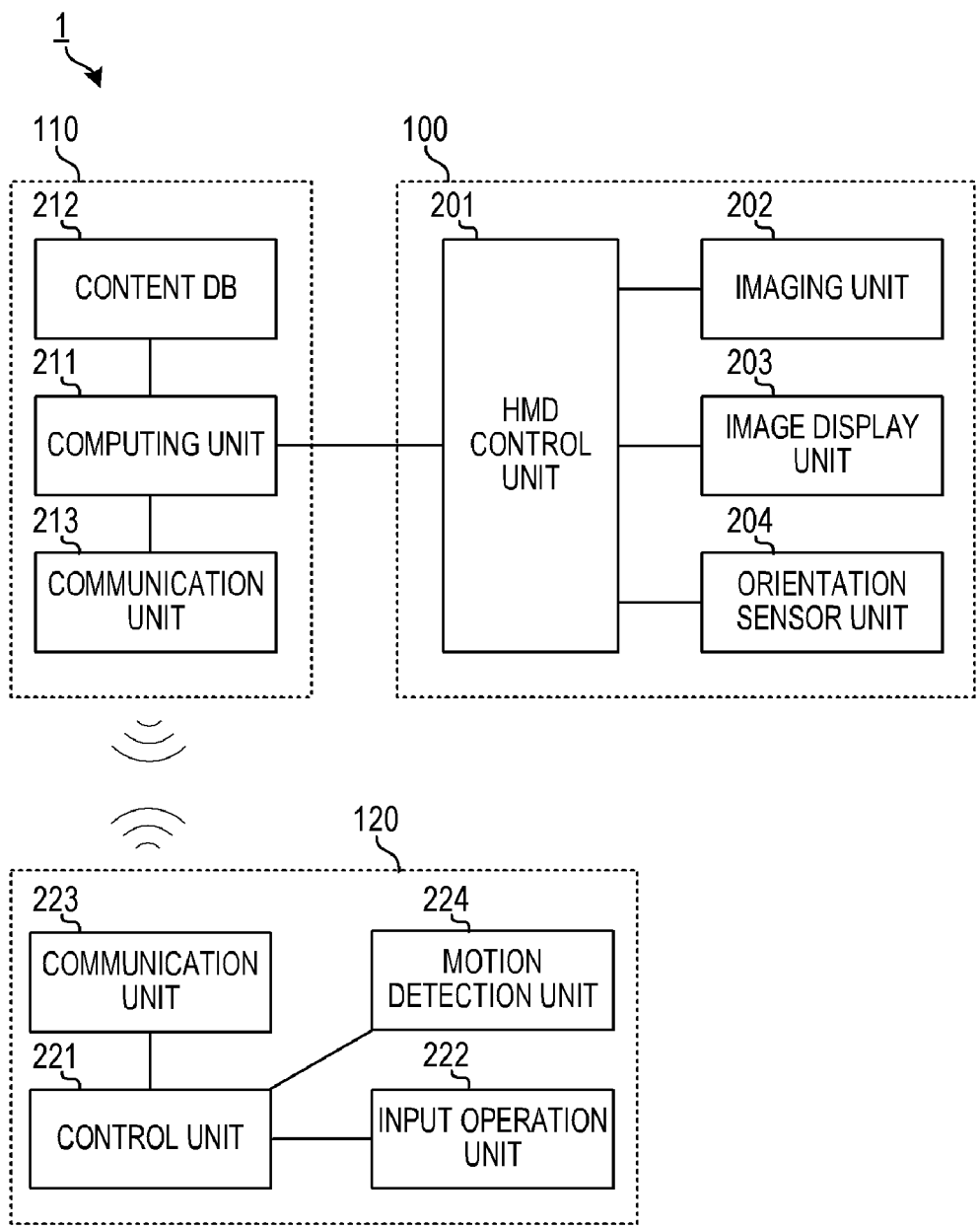
FIG. 2 is a diagram showing the internal configurations of the information processing system.

The internal configurations of the HMD 100 will be described with reference to FIG. 2. The HMD 100 has an HMD control unit 201, an imaging unit 202, an image display unit (display) 203, and an orientation sensor unit 204.

The HMD control unit 201 controls the respective configurations of the HMD 100. When acquiring a combined image (an image in which a captured image obtained by capturing an image of a space in front of a user with the imaging unit 202 and a CG are combined together) from the image processing device 110, the HMD control unit 201 displays the combined image on the image display unit 203. The user is capable of seeing the combined image displayed on the image display unit 203 with the HMD 100 attached thereto. The user is capable of experiencing various mixed realities such as one in which a CG is merged with a reality space.

The imaging unit 202 may include two cameras (imaging devices). In order to capture an image of the same space as a space seen by the user at a normal time, the two cameras may only be arranged near positions of the right and left eyes of the user when the HMD 100 is attached to the user. An image of an object (a range in front of the user) captured by the two cameras is output to the image processing device 110. Further, the two cameras of the imaging unit 202 are capable of acquiring information on distances from the two cameras to an object as distance information by ranging based on stereo cameras.

Figure 4A:
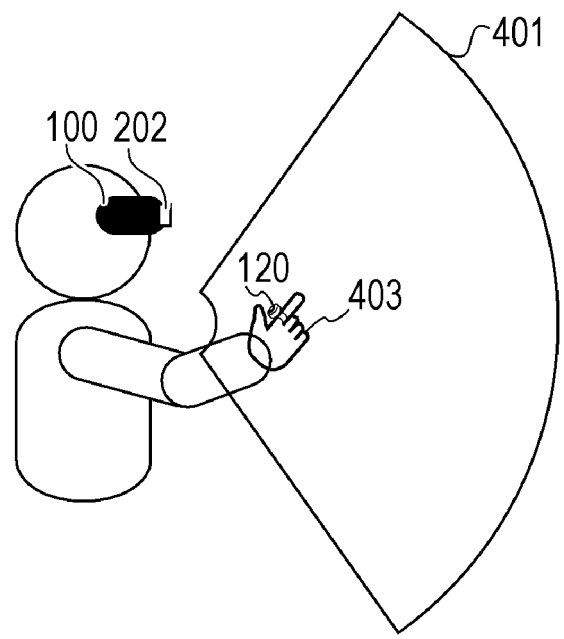
FIGS. 4A and 4B are diagrams showing angles of view of an imaging unit.
Figure 4B:
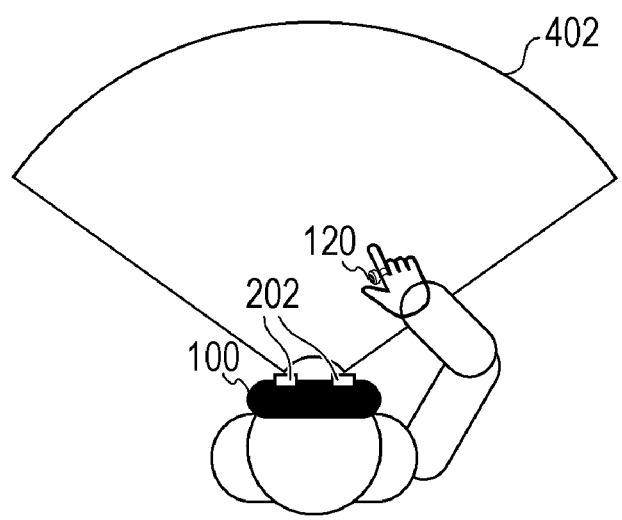

FIGS. 4A and 4B show angles of view of the imaging unit (cameras) 202. FIG. 4A shows an angle of view 401 in a perpendicular direction, and FIG. 4B shows an angle of view 402 in a horizontal direction. The angles of view 401 and 402 of the imaging unit 202 may be set to be almost the same as a visual field of the user having the HMD 100 attached thereto. When a visual line direction of the user is changed as the user moves the head 130 vertically or horizontally, directions of the angles of view 401 and 402 also change correspondingly. In a case where a hand 403 of the user is included in the angles of view 401 and 402 of the imaging unit 202, an image in which the hand 403 of the user is reflected is photographed by the imaging unit 202.

The image display unit 203 displays a combined image. The image display unit 203 has, for example, a display panel made up of a liquid-crystal panel, an organic EL panel, or the like. In a state in which the user has the HMD 100 attached thereto, the display panel is arranged in front of the respective right and left eyes of the user.

Note that the image display unit 203 may be replaced by a device using a semi-transmissive half mirror, and there is a case generally called AR where a CG is directly superimposed on a see-through reality space to make observation. Further, there is a case generally called VR where a perfect virtual space is displayed on a display panel to make observation without using the imaging unit 202.

The orientation sensor unit 204 detects an orientation (and a position) of the HMD 100. Then, the orientation sensor unit 204 detects (acquires) an orientation of the user (the user having the HMD 100 attached thereto) that corresponds to the orientation (and the position) of the HMD 100. The orientation sensor unit 204 has an inertial measurement unit (IMU). The orientation sensor unit 204 outputs information (orientation information) on the orientation of the user to the image processing device 110.

Internal Configurations of Image Processing Device

The internal configurations of the image processing device 110 will be described with reference to FIG. 2. The image processing device 110 is a control device having a computing unit 211, a content database (DB) 212, and a communication unit 213.

The computing unit 211 receives an image (captured image) acquired by the imaging unit 202 and orientation information acquired by the orientation sensor unit 204 from the HMD 100. The computing unit 211 performs image processing to cancel the aberration between an optical system of the imaging unit 202 and an optical system of the image display unit 203 on the captured image. Then, the computing unit 211 combines the captured image with any CG to generate a combined image. The computing unit 211 transmits the combined image to the HMD control unit 201 in the HMD 100.

Note that the computing unit 211 controls a position, a direction, and a size of a CG in a combined image on the basis of information (distance information and orientation information) acquired by the HMD 100. For example, when arranging a virtual object indicated as a CG near a specific object existing in a reality space in a space expressed by a combined image, the computing unit 211 makes a size of the virtual object (CG) larger as the specific object is positioned closer to the imaging unit 202. By controlling a position, a direction, and a size of a CG like this, the computing unit 211 is capable of generating a combined image as if a CG virtual object not existing in a reality space were arranged in the reality space.

Further, the computing unit 211 performs reception of an input operation by the hand device 120, reception of an input operation by hand tracking using a captured image acquired from the HMD 100, display control of the HMD 100 based on an input operation, or the like. Details of processing associated with the input operation will be described later.

The computing unit 211 performs processing to detect a position and an orientation of the hand 403 of the user from an image photographed by the imaging unit 202. For the detection of the position and the orientation of the hand 403, a method using a machine learning model such as a deep neural network or a classic machine learning algorithm such as a support vector machine may be, for example, used.

The content DB 212 is a storage unit that stores information such as a CG. Note that the computing unit 211 is capable of switching a CG read from the content DB 212 (that is, a CG used to generate a combined image).

Internal Configurations of Hand Device

The internal configurations of the hand device 120 will be described with reference to FIG. 2. The hand device 120 has a control unit 221, an input operation unit 222, a communication unit 223, and a motion detection unit 224.

The control unit 221 controls the respective configurations of the hand device 120. The control unit 221 may be made up of a small general-purpose processor, a memory, and a program, or may be made up of a dedicated microprocessor, an ASIC, or the like.

The input operation unit 222 includes a button in which an optical track pad (hereinafter called an OTP) enabling an input of a two-dimensional movement amount is embedded. Information (operating information) on depression or sliding of a finger with respect to the OTP on the input operation unit 222 is transmitted to the image processing device 110 via the communication unit 223.

For example, a user is capable of moving a pointer displayed on the HMD 100 to a prescribed position by sliding a finger on the OTP. Further, the user is capable of giving instructions to perform specific processing to the HMD 100 or the image processing device 110 by depressing a button of the OTP. As described above, the user is capable of controlling the HMD 100 according to a combination of the sliding of a finger and the depression of the button on the OTP.

The input operation unit 222 may include any operation member besides the OTP (or instead of the OTP). As an operation unit enabling an input of a two-dimensional movement amount, the input operation unit 222 includes, for example, a touch pad, a touch panel, a cross key, a button, a joystick, a track pad device, or the like.

The communication unit 223 performs wireless communication with the image processing device 110 (the communication unit 213). As wireless communication, general-purpose wireless communication using, for example, a 2.4 GHz band is available. The motion detection unit 224 has an inertial measurement unit (IMU) (inertial sensor) capable of detecting inertial information (a spatial movement amount or an angle) on the hand device 120. In the present embodiment, the motion detection unit 224 uses an IMU that includes a three-axis (x, y, z) acceleration sensor and a three-axis angular-speed (gyro) sensor, and that is capable of acquiring inertial information on six degrees of freedom of motion in x, y, and z directions and rotation about x, y, and z axes. The inertial information is transmitted to the image processing device 110 via the communication unit 223. Note that the motion detection unit 224 may have any device so long as the device does not hinder miniaturization of the hand device 120 and is capable of detecting inertial information (information such as a position displacement, a speed, and acceleration).

With the hand device 120, the user is capable of operating a CG object or a graphical user interface (GUI) displayed on the image display unit 203 of the HMD 100.

Figure 5:
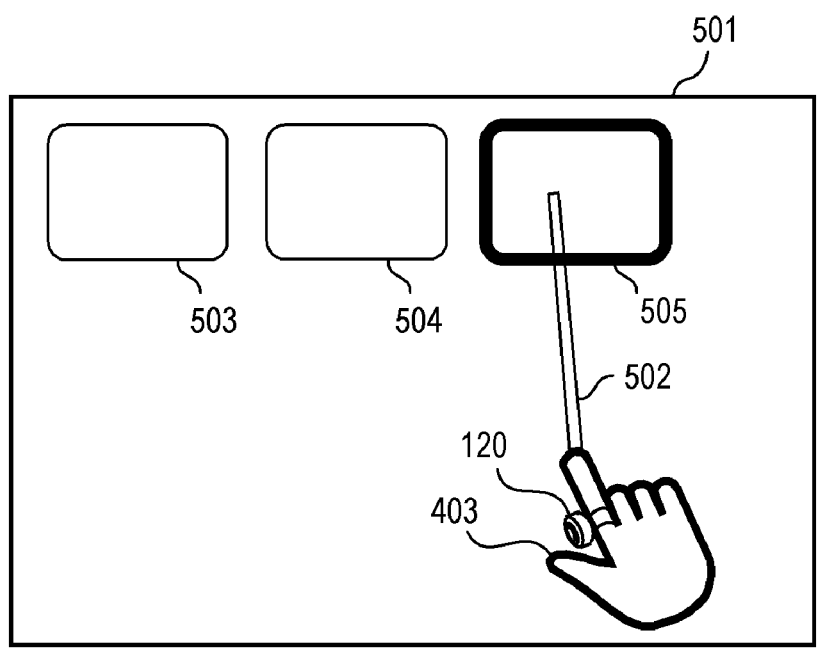
FIG. 5 is a diagram showing an example of a display screen of an HMD.

FIG. 5 shows an example of a combined image 501 displayed on the image display unit 203. The combined image 501 is one in which CG objects such as three buttons 503, 504, and 505 and a ray 502 are superimposed on an image of a reality space photographed by the imaging unit 202. The ray 502 is a kind of a pointer used to indicate any position or object on an XR space. For example, the ray 502 is drawn as a CG linearly extending toward a direction indicated by the hand 403 or a finger with a position of the hand 403 of the user having the hand device 120 attached thereto as a start point. When the user moves the hand 403 to which the hand device 120 is attached, the start point or a direction of the ray 502 changes according to the motion of the hand 403. According to a position indicated by the tip of the ray 502, the user is capable of indicating (pointing) a desired position or a CG object. In addition, the user is capable of performing an operation such as depressing the buttons 503 to 505 on an XR space, moving a slider, and attracting a distant object in combination with an operation of the input operation unit 222 such as the OTP of the hand device 120. That is, the ray 502 is a UI used to specify an object (called a "target object" or simply a "target") to be operated by the user among a plurality of objects displayed on the image display unit 203.

Processing to Display Ray

Figure 3:
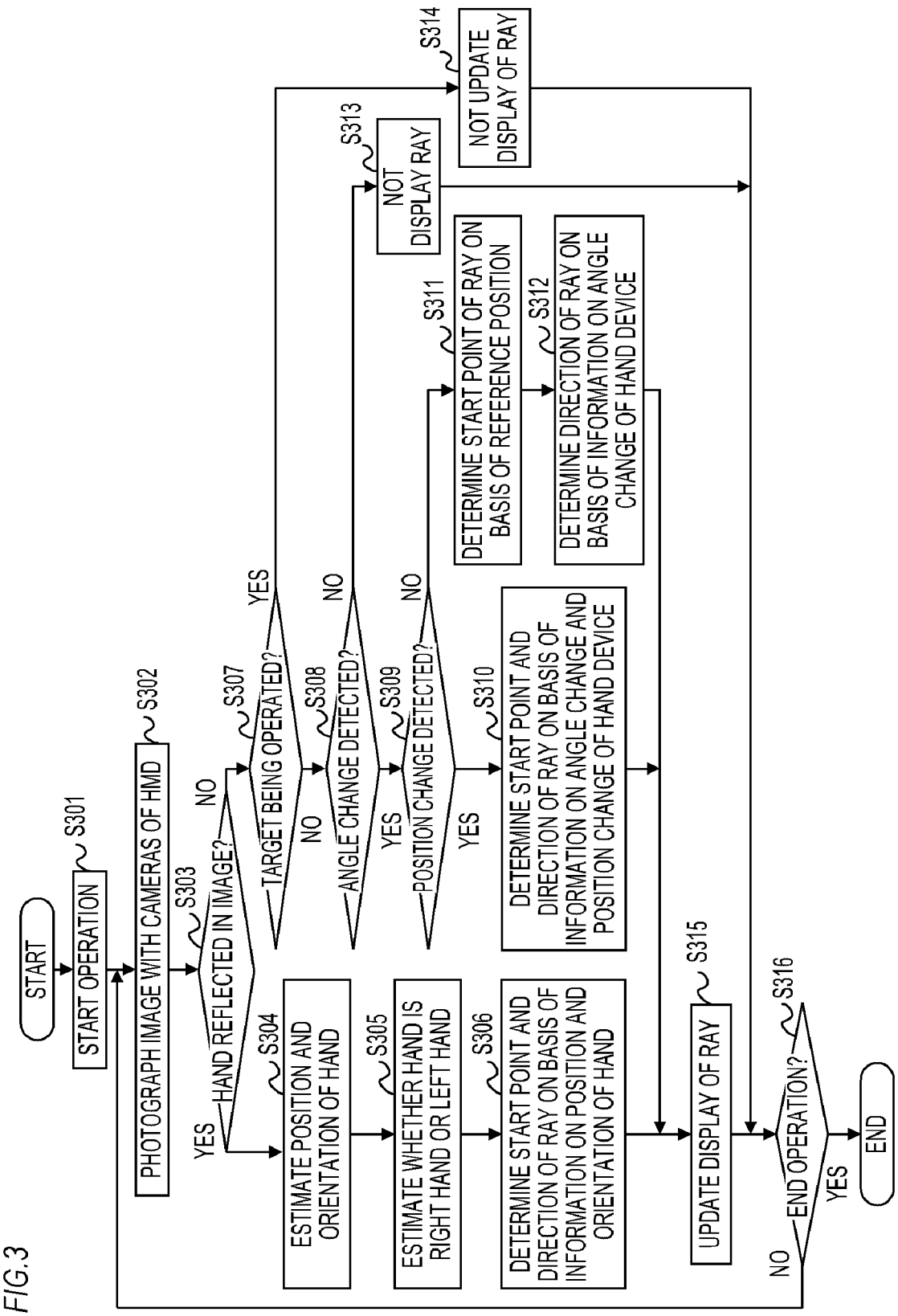
FIG. 3 is a flowchart of processing to display a ray.

Next, the flow of processing to display the ray 502 by the information processing system 1 will be described using FIG. 3. The flow of FIG. 3 starts in a state in which a user has the HMD 100 attached to the head 130 and has the hand device 120 attached to one of right and left hands. Note that a description here will be given using a state in which the user has the hand device 120 attached to the index finger of the right hand as an example.

In S301, the computing unit 211 receives operation start instructions from the user via the input operation unit 222 and starts an operation.

In S302, the computing unit 211 photographs an image with the imaging unit 202. FIGS. 4A and 4B show ranges in which an image is capable of being photographed. FIG. 4A shows the angle of view 401 of the cameras in the perpendicular direction, and FIG. 4B shows the angle of view 402 of the cameras in the horizontal direction. When the hand 403 of the user is included in the angle of view 401 and the angle of view 402 as shown in FIGS. 4A and 4B, the hand 403 of the user having the hand device 120 attached thereto is reflected in the image photographed by the imaging unit 202.

In S303, the computing unit 211 determines whether the hand 403 is reflected in the image photographed in S302 (that is, whether the hand 403 is detectable from the image) through a machine learning model or the like. The computing unit 211 proceeds to S304 when determining that the hand 403 is reflected (that is, when the hand 403 is detectable from the image) or proceeds to S307 when determining that the hand 403 is not reflected (that is, when the hand 403 is not detectable from the image). When a plurality of hands is detected from the image, the computing unit 211 may narrow down the hand 403 of the user according to the presence or absence of the attachment of the hand device 120.

(1) When the Hand 403 is Detectable from the Image.

In S304, the computing unit 211 estimates a position and an orientation of the hand 403 reflected in the image photographed in S302 through the machine learning model or the like. In S305, the computing unit 211 estimates whether the hand 403 reflected in the image photographed in S302 is the right hand or the left hand through the machine learning model or the like. In S306, the computing unit 211 determines a start point and a direction of the ray 502 on the basis of information on the position and the orientation of the hand 403 estimated in S304.

In S315, the computing unit 211 displays the ray 502 on the image display unit 203 on the basis of the start point and the direction of the ray 502 determined in S306. FIG. 5 is a display example of the ray 502 on the image display unit 203.

(2) When the Hand 403 is not Detectable from the Image.

In S307, the computing unit 211 determines whether a target such as a GUI and an object is being operated by the user. Here, "a target being operated" indicates, for example, a state in which a specified target is being held by the ray 502, a state in which a held target is being moved, or the like. For example, the user is capable of holding (selecting) a target by a hand gesture or an operation on the input operation unit 222, and capable of moving the target by moving the hand 403 after holding the target. The hand gesture is detected using an image (moving image) of a plurality of frames photographed by the imaging unit 202. For example, when detecting an operation (pinch) to make the tips of the index finger and the thumb of the hand 403 touch each other, the computing unit 211 interprets the operation as a gesture to hold an object. Note that the hand gesture may also be an operation other than the pinch.

The computing unit 211 proceeds to S314 when determining in S307 that the target is being operated or proceeds to S308 when determining that the target is not being operated.

(2-1) When the Target is not being Operated.

In S308, the computing unit 211 determines whether the motion detection unit 224 of the hand device 120 has detected an angle change. The computing unit 211 proceeds to S309 when the angle change has been detected. Otherwise, the computing unit 211 proceeds to S313.

In S309, the computing unit 211 determines whether the motion detection unit 224 of the hand device 120 has detected a position change. The computing unit 211 proceeds to S310 when the position change has been detected. Otherwise, the computing unit 211 proceeds to S311.

(2-1-1) when the Angle Change and the Position Change of the Hand Device 120 have been Detected.

In S310, the computing unit 211 calculates an orientation of the hand device 120 from information on the angle change of the hand device 120 and determines a direction of the ray 502 on the basis of the orientation of the hand device 120. Further, the computing unit 211 calculates a position of the hand device 120 from information on the position change of the hand device 120, and determines a start point of the ray 502 on the basis of the position of the hand device 120.

In S315, the computing unit 211 displays the ray 502 on the image display unit 203 on the basis of the start point and the direction of the ray 502 determined in S310.

(2-1-2) when the Position Change of the Hand Device 120 has not been Detected.

In S311, the computing unit 211 determines a start point of the ray 502 on the basis of a prescribed reference position. However, since the hand 403 of the user has not been detected by the imaging unit 202 of the HMD 100 and the position change of the hand device 120 has not been detected, the computing unit 211 is not able to determine the start point of the ray 502 on the basis of a position and an orientation of the hand 403 or position information on the hand device 120. Therefore, the computing unit 211 stores in advance a position at which the hand 403 of the user was detected by the imaging unit 202 last time, that is, a start point of the ray 502 immediately before the hand 403 moves from the inside to the outside of a range detected by the imaging unit 202 in a memory. Then, the computing unit 211 fixes the start point of the ray 502 at the position stored in advance during a period in which the hand 403 of the user has not been detected by the imaging unit 202.

Further, the prescribed reference position may be different between a case where the hand device 120 is attached to the right hand and a case where the hand device 120 is attached the left hand. For example, the reference position where the hand device 120 is attached to the right hand may be set at the lower right end of the screen of the image display unit 203, and the reference position where the hand device 120 is attached to the left hand may be set at the lower left end of the screen of the image display unit 203. Then, during a period in which the hand of the user has not been detected in S303, the computing unit 211 may set the start point of the ray 502 at a prescribed position on the screen on the basis of information as to whether the hand 403 of the user is the right hand or the left hand detected in S305.

In S312, the computing unit 211 calculates an orientation of the hand device 120 from information on an angle change of the hand device 120 and determines a direction of the ray 502 on the basis of the orientation of the hand device 120.

In S315, the computing unit 211 displays the ray 502 on the image display unit 203 on the basis of the start point of the ray 502 determined in S311 and the direction of the ray 502 determined in S312.

(2-1-3) when the Angle Change of the Hand Device 120 has not been Detected.

In S313, the computing unit 211 does not display the ray 502 on the image display unit 203. That is, when the hand 403 of the user has not been detected by the imaging unit 202 of the HMD 100 and the angle change has not been detected by the motion detection unit 224 of the hand device 120, the computing unit 211 does not display the ray 502.

(2-2) When the Target is being Operated.

In S314, the computing unit 211 does not update the start point or the direction of the ray 502 displayed on the image display unit 203.

In S316, the computing unit 211 determines whether operation end instructions have been received from the user via the input operation unit 222. The computing unit 211 ends the operation when having received the operation end instructions from the user. The computing unit 211 proceeds to S302 when having not received the operation end instructions from the user.

Advantages of Present Embodiment

The information processing system 1 of the present embodiment has the following features and advantages.

The information processing system 1 includes: a first device (for example, the HMD 100) attached to the head 130 of a user; a second device (for example, the hand device 120) attached to the hand 403 of the user; and a processing unit (for example, the image processing device 110). The first device has a display unit (for example, the image display unit 203) capable of displaying a CG object (for example, the ray 502) that moves according to motion of the hand 403 of the user, and a first sensor (for example, the imaging unit 202) usable to detect the hand 403 of the user. The second device has a second sensor (for example, the motion detection unit 224) to be used to detect an orientation of the second device. The processing unit (processing device) estimates an orientation of the hand 403 from a detection result (for example, an image) by the first sensor when the hand 403 of the user is detectable by the first sensor (for example, S304), and determines a direction of a CG object on the basis of the estimated orientation of the hand 403 (for example, S306). On the other hand, the processing unit determines the direction of the CG object on the basis of an orientation of the second device detected by the second sensor when the hand 403 of the user is not detectable by the first sensor (for example, S310 and S312). According to this configuration, update of a direction of a CG object is enabled on the basis of an orientation of the second device attached to the hand 403 of a user even if the hand 403 of the user moves to the outside of a range detected by the first sensor of the first device. Accordingly, operability or availability of a CG object (for example, a pointer such as the ray 502) that moves according to motion of the hand 403 of a user may be further improved.

The processing unit estimates a position of the hand 403 from a detection result (for example, an image) by the first sensor when the hand 403 of a user is detectable by the first sensor (for example, S304), and determines a position of a CG object on the basis of the estimated position of the hand 403 (for example, S306). According to this configuration, it is possible to operate not only a direction of a CG object but also a drawing position (such as a start point, a central point, and an end point) of the CG object.

The second device has a third sensor (for example, the motion detection unit 224) to be used to detect a position of the second device. The processing unit determines a position of a CG object on the basis of a position of the second device detected by the third sensor when the hand 403 of a user is not detectable by the first sensor (for example, S310). According to this configuration, update of a position of a CG object is enabled on the basis of a position of the second device attached to the hand 403 of a user even if the hand 403 of the user moves to the outside of a range detected by the first sensor of the first device.

The processing unit is also capable of determining a position of a CG object on the basis of a prescribed reference position when the hand 403 of a user is not detectable by the first sensor (for example, S311). For example, when the hand 403 of a user is not detectable by any of the first sensor and the second sensor, a position of a CG object may be determined on the basis of a prescribed reference position like the above embodiment. With such a configuration, it is possible to determine or update a drawing position of a CG object even if the hand 403 of a user deviate from a range detected by the first sensor or a position of the second device is not detectable for any reason. Accordingly, a further improvement in availability of a CG object is expectable. The prescribed reference position is, for example, a position at which the hand 403 of a user was detected by the first sensor last time, that is, a position of a CG object immediately before the hand 403 moves to the outside of a range detected by the first sensor. Alternatively, the prescribed reference position may be set at a prescribed position (fixed position) on a screen. At this time, the prescribed reference position may be different between a case where the hand 403 of the user having the second device attached thereto is a right hand and a case where the hand 403 of the user having the second device attached thereto is a left hand. In any way, continuation of drawing or an operation of a CG object is enabled without impairing operability of a user.

The processing unit determines whether the hand 403 is a right hand or a left hand from a detection result (for example, an image) obtained when the hand 403 of a user is detectable by the first sensor (for example, S305). When a plurality of hands are detected from a detection result, the processing unit identifies the hand 403 of a user on the basis of the presence or absence of the attachment of the second device. With this configuration, it is possible to discriminate whether the hand 403 is a right hand or a left hand without addition of a special device.

The processing unit does not update display of a CG object (for example, the ray 502) when the hand 403 of a user is not detectable by the first sensor and when a specified target object is being operated by the user using the CG object (for example, S314). This is because pointing with the CG object such as the ray 502 is not necessary for the user when the target object is being operated. The processing unit may display a CG object without changing a direction or a drawing position of the CG object or may temporarily hide the CG object. With this configuration, realization of a UI having excellent operability and usability is enabled.

MISCELLANEOUS

The preferred embodiments of the present invention are described above. The present invention is not limited to these embodiments but is deformable and modifiable in various ways within the range of its gist. For example, the first device is not limited to a goggle type as shown in FIG. 1 but may include devices with other structures such as a helmet type and a glasses type. The second device is not limited to a ring type as shown in FIG. 1 but may include devices with other structures such as a wristwatch type and a hand-held type. The CG object is not limited to the ray 502 as shown in FIG. 5 but may include any form so long a CG moves according to motion of the hand 403 of a user. In the above embodiments, the imaging unit (cameras) 202 serves as the first sensor used to detect the hand 403 of the user. This configuration is advantageous in terms of simplifying the structure of the first device and reducing costs. However, a different first sensor used to detect the hand 403 may also be installed in the first device separately from the imaging unit 202.

Note that the respective function units of the above embodiments may be or may not be separate hardware. The functions of at least two function units may be realized by common hardware. Each of a plurality of functions of one function unit may be realized by separate hardware. At least two functions of one function unit may be realized by common hardware. Further, respective function units may be or may not be realized by hardware such as an ASIC, an FPGA, and a DSP. For example, a device may have a processor and a memory (storage medium) in which a control program is stored. Further, the functions of at least some function units of the device may be realized when the processor reads a control program from the memory and runs the read program.

According to the present disclosure, it is possible to further improve operability of a CG object that moves according to motion of a hand of a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-022531, filed on Feb. 16, 2023, which is hereby incorporated by reference herein in its entirety.

What is claimed is:

1. An information processing system comprising:
a first device to be attached to a head of a user;
a second device to be attached to a hand of the user; and
a processing device,
wherein,
the first device has a display capable of displaying a computer graphics (CG) object that moves according to motion of the hand of the user and a first sensor usable to detect the hand of the user,
the second device has a second sensor to be used to detect an orientation of the second device, and
the processing device:
estimates an orientation of the hand of the user from a detection result by the first sensor and determines a direction of the CG object based on the estimated orientation of the hand in a case where the hand of the user is detectable by the first sensor,
determines a direction of the CG object based on the orientation of the second device detected by the second sensor in a case where the hand of the user is not detectable by the first sensor, and
determines a position of the CG object based on a predetermined reference position in a case where the hand of the user is not detectable by the first sensor,
wherein the predetermined reference position is different between a case where the hand of the user is a right hand and a case where the hand of the user is a left hand.

2. The information processing system according to claim 1, wherein the processing device estimates a position of the hand of the user from the detection result by the first sensor and determines a position of the CG object based on the estimated position of the hand in a case where the hand of the user is detectable by the first sensor.

3. The information processing system according to claim 1, wherein
the second device has a third sensor to be used to detect a position of the second device, and
the processing device determines a position of the CG object based on a position of the second device detected by the third sensor in a case where the hand of the user is not detectable by the first sensor.

4. The information processing system according to claim 3, wherein the third sensor is an acceleration sensor.

5. The information processing system according to claim 1, wherein
the predetermined reference position is a position at which the hand of the user is detected by the first sensor last time.

6. The information processing system according to claim 1, wherein
the predetermined reference position in a case where the hand of the user is the right hand is a lower right end of the display, and
the predetermined reference position in a case where the hand of the user is the left hand is a lower left end of the display.

7. The information processing system according to claim 1, wherein the processing device;
determines whether the hand of the user is the right hand or the left hand from the detection result obtained when the hand of the user is detected by the first sensor, and
switches the predetermined reference position according to a determination result as to whether the hand of the user is the right hand or the left hand.

8. The information processing system according to claim 1, wherein the CG object is a user interface to be used to specify a target object to be operated by the user among objects displayed on the display.

9. The information processing system according to claim 8, wherein the processing device does not update display of the CG object in a case where the hand of the user is not detectable by the first sensor and in a case where the target object specified by the CG object is being operated by the user.

10. The information processing system according to claim 1, wherein the first device is a head-mounted display.

11. The information processing system according to claim 1, wherein the first sensor is a camera.

12. The information processing system according to claim 1, wherein the second sensor is an angular speed sensor.

13. The information processing system according to claim 1, wherein the second device is a wearable-type device.

14. The information processing system according to claim 13, wherein the second device is a ring-type device.

15. A control method for an information processing system including a first device to be attached to a head of a user, a second device to be attached to a hand of the user, and a processing device,
the first device having a display and a first sensor usable to detect the hand of the user,
the second device having a second sensor to be used to detect an orientation of the second device,
the control method comprising:
displaying a computer graphics (CG) object on the display, by the processing device; and
updating display of the CG object so that the CG object moves according to motion of the hand of the user, by the processing device,
wherein the processing device;

estimates an orientation of the hand of the user from a detection result by the first sensor and determines a direction of the CG object based on the estimated orientation of the hand in a case where the hand of the user is detectable by the first sensor, determines a direction of the CG object based on the orientation of the second device detected by the second sensor in a case where the hand of the user is not detectable by the first sensor, and determines a position of the CG object based on a predetermined reference position in a case where the hand of the user is not detectable by the first sensor, wherein the predetermined reference position is different between a case where the hand of the user is a right hand and a case where the hand of the user is a left hand.

16. A non-transitory computer readable medium that stores a program, wherein the program causes a computer to execute a control method of an information processing system including a first device to be attached to a head of a user, a second device to be attached to a hand of the user, and a processing device, the first device having a display and a first sensor usable to detect the hand of the user, the second device having a second sensor to be used to detect an orientation of the second device, the control method comprising:

displaying a computer graphics (CG) object on the display, by the processing device; and updating display of the CG object so that the CG object moves according to motion of the hand of the user, by the processing device, wherein the processing device:

estimates an orientation of the hand of the user from a detection result by the first sensor and determines a direction of the CG object based on the estimated orientation of the hand in a case where the hand of the user is detectable by the first sensor, determines a direction of the CG object based on the orientation of the second device detected by the second sensor in a case where the hand of the user is not detectable by the first sensor; and determines a position of the CG object based on a predetermined reference position in a case where the hand of the user is not detectable by the first sensor, wherein the predetermined reference position is different between a case where the hand of the user is a right hand and a case where the hand of the user is a left hand.

* * * * *